Figure 1:
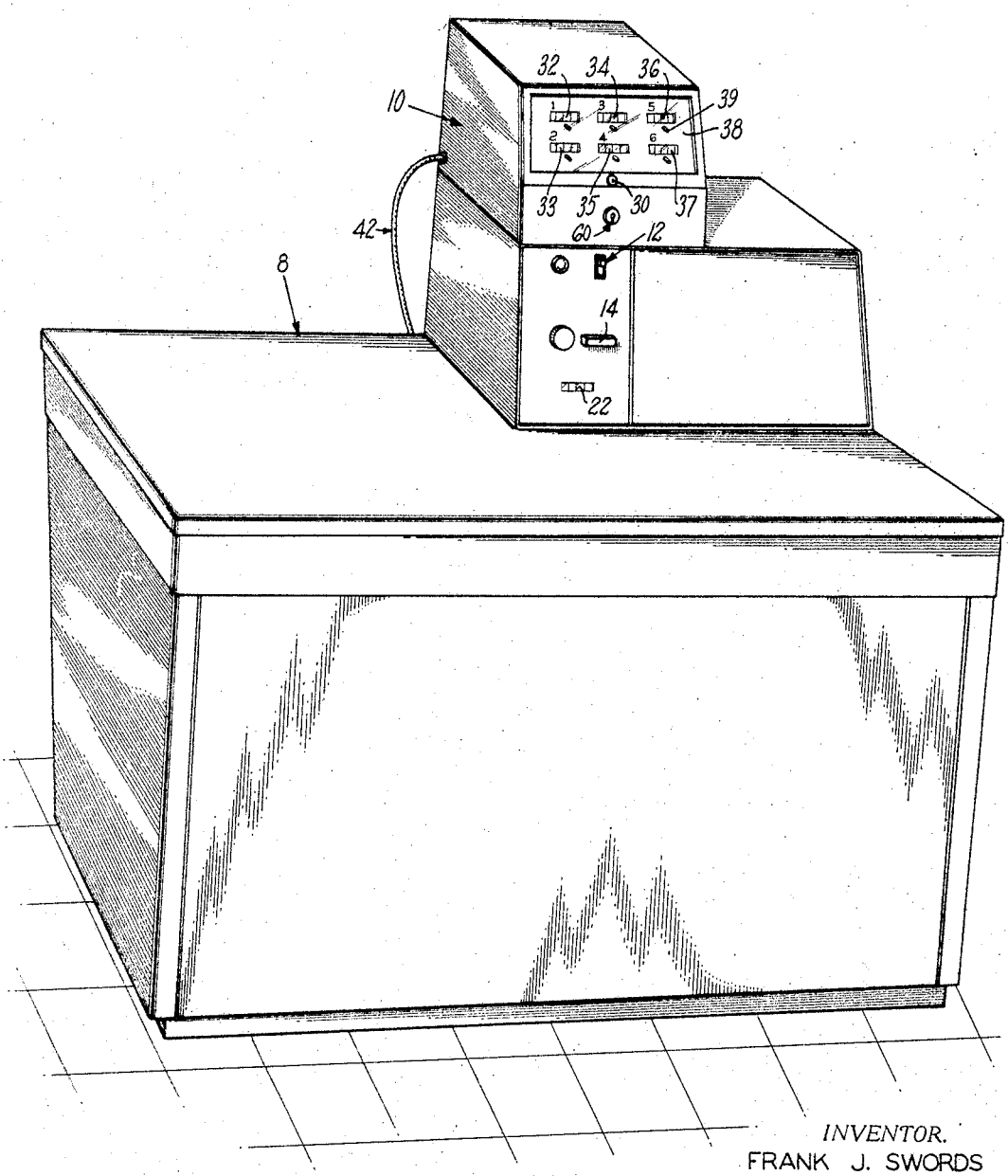

INVENTOR.
FRANK J. SWORDS

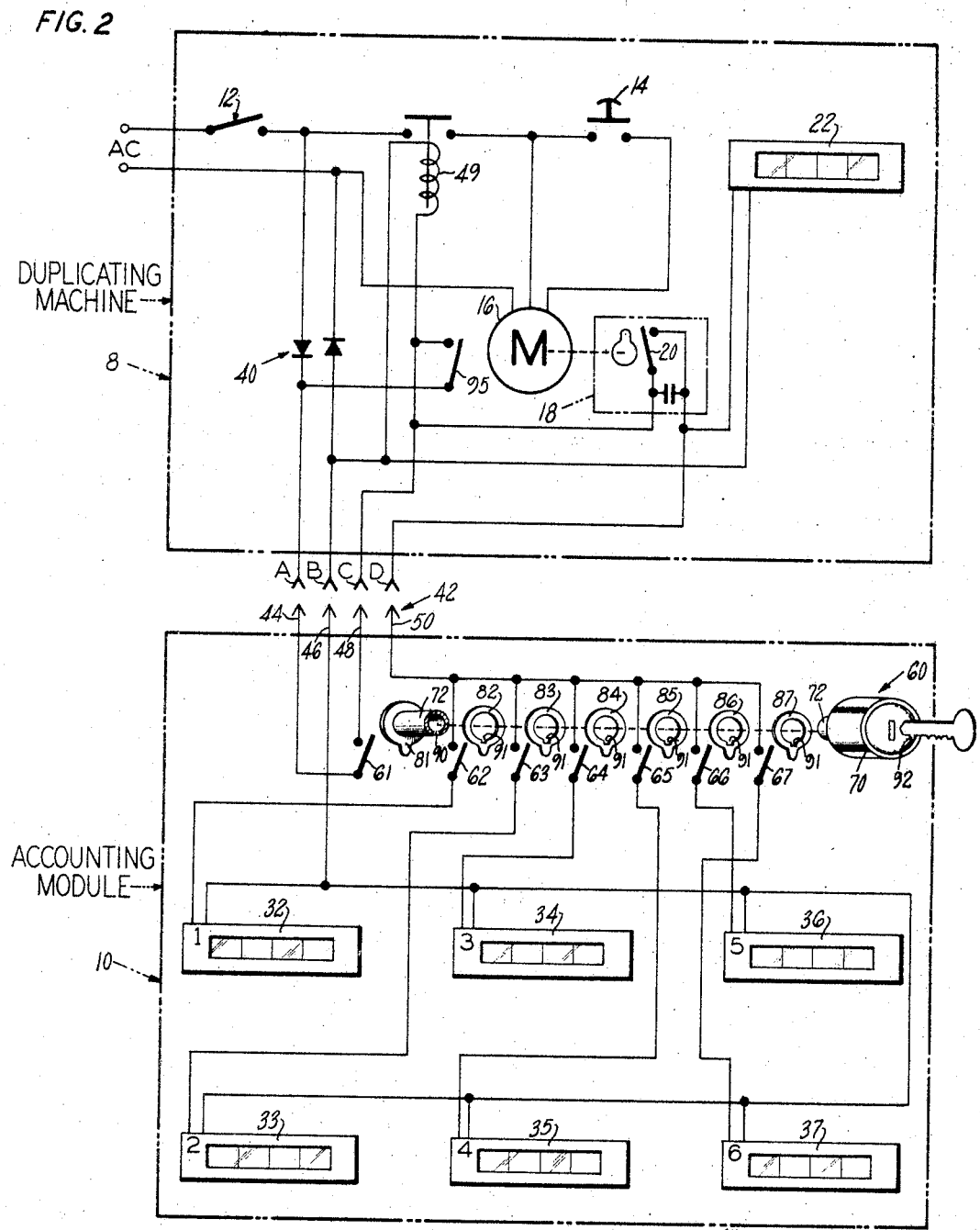

United States Patent Office 3,427,441
Patented Feb. 11, 1969

3,427,441
DUPLICATING MACHINE ACCOUNTING SYSTEM
Frank J. Swords, Bloomfield, Conn., assignor to Veeder Industries Inc., Hartford, Conn., a corporation of Connecticut
Filed Oct. 5, 1965, Ser. No. 493,189
U.S. Cl. 235—92
Int. Cl. G06f 7/42
6 Claims The present invention relates to business machine accounting systems and more particularly to a business machine accounting system having notable usefulness with a duplicating machine for assisting in accounting for the number of duplicates made, for example by several businesses, corporate departments, etc., which have joined together to use a single duplicating machine for the purpose of sharing the overhead and/or operating expenses of the machine.

Modern duplicating machines, for example, are becoming more and more essential to the efficient reproduction of correspondence, reports, etc., and therefore, where the usual rather substantial overhead and/or operating expenses of the modern duplicating machine would be too burdensome for a single business, it has become useful for two or more businesses to join together to use a single duplicating machine in order to share these overhead and operating expenses. With this joint use of a single duplicating machine it usually becomes desirable to allocate the overhead and/or operating expenses of the machine to the various users, for example in accordance with the number of copies made with the duplicating machine by each user or in accordance with the time period during which the duplicating machine is employed by each user.

It is therefore a principal aim of the present invention to provide a new and improved accounting system for a duplicating machine which provides a continuous accounting of the use of the machine by each of the parties authorized to operate the machine.

It is another aim of the present invention to provide a new and improved accounting system for a duplicating or other business machine which provides for limiting the use of the machine to the parties authorized to operate the machine and which additionally provides for continuously accounting for the use of the machine by each of the authorized parties.

It is a further aim of the present invention to provide an accounting system module which is adapted to be readily connected to a duplicating or other business machine—of the type employing a totalizer for registering the total number of copies made with the machine, or in the alternative, the total time which the business machine is used—for providing a continuous accounting of the use of the machine by each of the parties authorized to operate the machine, and which is adapted to be readily disconnected from the machine when it is desired to account for the use of the machine with the totalizer in a conventional manner.

It is another aim of the present invention to provide an accounting module of the type described, which is adapted to be readily employed with a duplicating or other business machine for providing a continuous accounting of the use of the machine by each of the authorized operators and to limit the operation of the machine to these authorized parties.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 1 is a perspective view of a business machine installation illustrating a modern duplicating machine for duplicating reports, manuscripts, etc., and an embodiment of an accounting module employed for providing a continuous accounting of the use of the duplicating machine by each of the authorized operators; and FIG. 2 is a generally schematic view diagrammatically showing components of the duplicating machine and accounting module of FIG. 1.

Referring now to the drawings in detail, a business machine installation is shown incorporating a duplicating or copying machine 8 and an embodiment of an accounting module of the present invention, generally denoted by the numeral 10, which provides a continuous accounting of the use of the machine by the parties authorized to operate the machine.

The duplicating machine 8 may be powered by an alternating current source in a conventional manner and is shown provided with a circuit having a master ON-OFF switch 12 and a push button switch 14 for activating the duplicating cycle of the machine by momentarily energizing a motor 16 which thereafter remains energized through the duplicating cycle to copy or duplicate a page of manuscript, etc., in a well-known manner. The duplicating machine circuit is also shown provided with an electrical pulsing device 18 having a switch 20 which is adapted to provide an electrical pulse for each complete cycle of the machine, or which with an alternative drive may be used to generate an electrical pulse for each preselected discrete interval of time the duplicating machine is operated. The switch 20 is connected to index an electromagnetically actuated counter or totalizer 22 for each pulse generated and to thereby provide a count of the number of copies made with the machine, or with the alternative pulse generator drive to provide a count which is a function of the time period of operation of the machine.

In accordance with the present invention, the accounting module 10 is associated with the duplicating machine for providing a continuous accounting of the operation of the machine among the parties who are authorized to use the machine, and for this reason the exemplary accounting module 10 in the drawings is shown provided with six individual electromagnetically operated counters 32–37, for example for six separate businesses which have agreed for reasons of economy to jointly employ a single duplicating machine for satisfying their duplicating needs. Also, the accounting module 10 may be provided with a suitable housing conforming in style and size to the duplicating machine with which it is to be associated and having a suitably hinged glass door 38 through which the counters 32–37 may be viewed. For convenience the counters may be provided with suitable reset levers 39 (FIG. 1) which may be manually actuated to reset the counter, and the reset levers 39 may be made inaccessible excepting to an authorized party by the provision of a door lock 30.

The pulse generator 20, the totalizer 22 and the accounting module 10 are shown having electrical circuitry that is powered by direct current, for which purpose a suitable rectifier 40 is shown employed in the circuitry of the duplicating machine. Also, in the preferred arrangement the accounting module 10 is detachably mounted upon the duplicating machine so that it can be readily employed in those installations where it is useful and can be readily removed when the special advantages provided by the accounting module are no longer desired. Thus, the accounting module may be merely placed on the duplicating machine, as shown in FIG. 1, and be electrically connected to the duplicating machine by a suitable electrical conduit 42 which includes the electrical leads 44 and 46 connected to the terminals A and B of the duplicating machine for supplying direct current to the module 10, a lead 48 connected to the terminal C for selectively energizing a control relay 49 in the machine circuitry and the pulse generator 18, and a lead 50 connected to the terminal D for supplying the electrical pulses generated by the pulse generator to the accounting module.

A single multiple-key lock, generally denoted by the numeral 60, is provided for selectively energizing the pulse generator 18 and the relay 47 with a master lock-actuated switch 61, and for selectively connecting the individual counters 32–37 to the pulse generator with the individual lock-operated switches 62–67, respectively, and thereby provide for indexing the selected counter with the totalizer 22. The lock is provided with a suitable security section 70, for example a security section of the tumbler variety, for assuring that the lock barrel 72 is adapted to be rotated only with the keys designed for the lock, and six individual keys (only one of which being shown in FIG. 2) having an identification, for example, of #1 through #6, respectively, are provided for operating the security section of the lock and therefore for rotating the lock barrel, and for additionally selectively actuating the individual switches 62–67, respectively.

The master switch 61 is operated by a cam plate 81 fixed upon the read end of the lock barrel 72 and is therefore adapted to be rotated to actuate the master switch with each of the six keys designed for operating the lock. The counter switches 62–67 are however selectively operated by the cam plates 82–87, respectively, which have circular openings therein for rotatably mounting the cam plates on the barrel and which are thereby adapted to be held in their inactive angular positions shown in FIG. 2 by suitable means (not shown) while the barrel 72 is rotated. The barrel 72 is shown provided with an axially extending slot 90 and the cam plates 82–87 are shown provided with suitable slots 91 in angular alignment with the slot 90 when the lock barrel is in its inactive or locked position shown in FIG. 2 so that, for example, a single projection or tang 92 provided on each of the six keys is adapted to be received within the slot 91 of the respective switch cam plate when the key is fully inserted within the lock barrel.

The master switch 61 and cam plate 81 are preferably related to the switches 62–67 and cam plates 82–87 so that the switches 62–67 are actuated with the came plates 82–87, respectively, prior to the actuation of the switch 61 with the cam plate 81. Thus, it is assured that the electromagnetically operated counter corresponding to the key employed to operate the lock is connected for being indexed by the pulse generator 18 before the duplicating machine is actuated.

Thus it can be seen that each of the six keys employed may be distributed to six separate businesses, departments, etc., which have joined together to employ a single duplicating machine, and with which each of the businesses, departments, etc., are able (1) to energize the relay 49 to activate the duplicating machine, (2) to energize the pulse generator 18 and (3) to selectively connect the counter associated with the key to the pulse generator so that the counter will be indexed with the totalizer 22 and thereby provide an individualized accounting of the machine operation by each of the businesses, departments, etc. Accordingly, the individual counters provide a ready source of information for use in allocating the overhead and/or operating costs of the machine. Moreover, with the accounting system of the present invention, only the eligible parties holding the keys may use the machine, and, as a single lock is employed, only one key may be used at a time to assure accurate accounting of each party's operation of the machine. Of course, additional counters and corresponding cams and keys could be provided if a larger number of eligible users were desired, or in the alternative two or more accounting modules 10 could be connected in parallel and a suitable interlock be provided to prevent using more than one module at a time. Further, with the module arrangement shown, the module may be readily attached to or detached from the duplicating machine with the electrical conduit 42, and when the accounting module is detached to condition the duplicating machine for normal operation, for example by closing an interlock switch 95 or by electrically connecting the terminals A and C of the duplicating machine with a suitable jump conductor.

As will be apparent to persons skilled in the art, various modifications and adaptations of the structure above described will become readily apparent without departure from the spirit and scope of the invention, the scope of which is defined in the appended claims.

I claim:

1. In combination with a business machine having an electrical pulsing device for generating electrical pulses in accordance with the use of the machine, an accounting system for the business machine for continuously accounting for the use of the machine by the various authorized operators, comprising individual electromagnetically operated counters for the authorized operators respectively, and a lock-operated switching mechanism having individual switches for selectively connecting the individual electromagnetically operated counters respectively to the electrical pulsing device, and a single multiple-key operated lock with individual keys corresponding to the individual electromagnetically operated counters, the lock having a rotary barrel for receiving the keys, security means for locking the barrel against rotation and operable with all of the keys for releasing the barrel for rotation, and a plurality of individual actuators operable by the individual keys respectively upon rotation of the barrel with the keys for selectively connecting the corresponding counters to the electrical pulsing device of the business machine.

2. In combination with an electrically operated duplicating machine having an electrical pulsing device for generating electrical pulses in accordance with the use of the machine, an accounting system for the duplicating machine for continuously accounting for the use of the machine by the various authorized operators, comprising individual electromagnetically operated counters for the authorized operators respectively, and a lock-operated switching mechanism having individual switches for selectively connecting the individual electromagnetically operated counters respectively to the electrical pulsing device, and a single multiple-key operated lock with individual keys corresponding to the individual electromagnetically operated counters; the lock having a rotary barrel for receiving the keys, security means for locking the barrel against rotation and operable with all of the keys for releasing the barrel for rotation, a plurality of individual switch actuators selectively operable by the individual keys respectively upon rotation of the barrel with the keys for connecting the corresponding counters to the electrical pulsing device of the duplicating machine, and master switching means operable by all of the keys for electrically energizing the duplicating machine after a switch actuator is selectively operated by the respective key to connect the corresponding counter to the electrical pulsing device.

3. In combination with a duplicating machine having a totalizer for registering the number of duplicates made with the machine and indexing means for indexing the totalizer for each duplicate made, an accounting system for the duplicating machine for continuously accounting for the number of duplicates made with the machine by each of the authorized operators, comprising individual electromagnetically operated counters for the authorized operators respectively, and a lock-operated selector mechanism for selectively connecting the individual counters respectively to the indexing means for counting the number of duplicates made by each of the authorized operators having a single multiple-key operated lock with individual keys corresponding to the individual counters respectively, the lock having a rotary barrel for receiving the keys, and means for locking the barrel against rotation operable with the keys to release the barrel for rotation, and a plurality of individual selectors operable by the individual keys respectively upon rotation of the barrel therewith for selectively connecting the individual counters respectively to the indexing means of the duplicating machine.

4. For use in combination with a duplicating machine having a totalizer and a totalizer pulsing device for indexing the totalizer in accordance with the number of duplicates made by the machine, an accounting module for registering the number of copies made with the machine by each of a plurality of authorized operators, comprising a plurality of individual electromagnetically operated counters for counting the number of duplicates made by the authorized operators respectively and a single multiple-key lock mechanism having individual keys for the authorized operators respectively, a rotary barrel for receiving the keys, locking means for locking the barrel against rotation and operable by all of the keys for releasing the barrel for rotation, and a plurality of mechanical actuators selectively activated by the keys upon rotation of the barrel with the keys for selectively connecting the totalizer pulsing device with the respective counters for selectively indexing the counters with the totalizer.

5. For use in combination with an electrically operated duplicating machine having an electromagnetic totalizer and an electrical pulsing device for indexing the totalizer in accordance with the number of duplicates made by the machine, an accounting module for registering the number of copies made with the machine by each of a plurality of authorized operators, comprising individual electromagnetic counters for counting the number of duplicates made by each of the authorized operators respectively and a multiple-key lock mechanism having a single multiple-key lock with individual keys for the authorized operators respectively, a rotary barrel for receiving the keys, locking means for locking the barrel against rotation and operable by the keys to release the barrel for rotation, a plurality of individual actuators operable by the individual keys upon rotation of the barrel thereby for selectively operably connecting the electrical pulsing device with the counters respectively, a master actuator operable with all of the keys, and switching means operable by the master actuator to electrically energize the duplicating machine only after the selected counter is operably connected to the electrical pulsing device.

6. In combination with an office business machine, an accounting system for continuously accounting for the use of the business machine by the authorized operators of the machine comprising individual electromagnetically operated counters for the authorized operators respectively, electrical indexing means operable for indexing the counters in accordance with the use of the office business machine, and a lock-operated control mechanism having selection means operable for selectively electrically connecting the counters to the electrical indexing means for individual operation thereby and a single multiple-key lock with individual keys for the authorized operators respectively, a rotary barrel for receiving the keys, barrel locking means for locking the barrel against rotation and operable by the keys for releasing the barrel for rotation, and key-operated means operable by the individual keys upon rotation of the barrel thereby for operating the selection means to connect the counter of the respective authorized operator for operation by the indexing means.

References Cited

UNITED STATES PATENTS

| | | | |
|---|---|---|---|
| 2,792,148 | 5/1957 | Goldenberg | 235—61.7 |
| 2,977,024 | 3/1961 | Harris | 235—61.7 |
| 2,995,275 | 8/1961 | Brice | 222—26 |
| 3,027,048 | 3/1962 | Rapisarda | 235—92 |
| 3,053,415 | 9/1962 | Pennington | 235—61.7 |
| 3,184,714 | 5/1965 | Brown | 235—61.7 |

MAYNARD R. WILBUR, *Primary Examiner.*

GREGORY J. MAIER, *Assistant Examiner.*

U.S. Cl. X.R.

200—42